United States Patent
Nangeroni et al.

(10) Patent No.: US 12,316,921 B2
(45) Date of Patent: May 27, 2025

(54) CONTENT CLASSIFIERS FOR AUTOMATIC PICTURE AND SOUND MODES

(71) Applicant: ROKU, INC., San Jose, CA (US)

(72) Inventors: Paul Nangeroni, San Carlos, CA (US); Erwin Ben Bellers, Fremont, CA (US); Robert Caston Curtis, Los Gatos, CA (US); Mustafa Ozgen, Palo Alto, CA (US)

(73) Assignee: Roku, Inc., San Jose, CA (US)

( * ) Notice: Subject to any disclaimer, the term of this patent is extended or adjusted under 35 U.S.C. 154(b) by 138 days.

(21) Appl. No.: 17/743,898

(22) Filed: May 13, 2022

(65) Prior Publication Data

US 2023/0370689 A1    Nov. 16, 2023

(51) Int. Cl.
| | |
|---|---|
| *H04N 21/485* | (2011.01) |
| *H04N 21/439* | (2011.01) |
| *H04N 21/44*  | (2011.01) |
| *H04N 21/45*  | (2011.01) |
| *H04N 21/466* | (2011.01) |

(52) U.S. Cl.
CPC ..... *H04N 21/4852* (2013.01); *H04N 21/4394* (2013.01); *H04N 21/44008* (2013.01); *H04N 21/4532* (2013.01); *H04N 21/4662* (2013.01)

(58) Field of Classification Search
None
See application file for complete search history.

(56) References Cited

U.S. PATENT DOCUMENTS

| | | | |
|---|---|---|---|
| 2018/0234472 A1* | 8/2018 | Malakar | H04L 69/24 |
| 2019/0327526 A1* | 10/2019 | Navin | H04N 21/25891 |
| 2022/0030102 A1 | 1/2022 | Lee et al. | |

OTHER PUBLICATIONS

Donges, A Complete Guide to the Random Forest Algorithm (https://web.archive.org/web/20220402165808/https://builtin.com/data-science/random-forest-algorithm) (archived Apr. 21, 2022) (last accessed Jan. 25, 2025) (Year: 2022).*
Extended European Search Report for Application No. 23173117.5 mailed Jul. 24, 2023, 9 pages.

* cited by examiner

*Primary Examiner* — Walter F Briney, III
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for modifying one or more parameters of a data streaming payload to add optimized display and/or audio settings as metadata. An example embodiment operates by training and operating a first machine learning model to predict optimized picture and sound settings. A second embodiment operates by training a learning model with crowdsourced individual user manual adjustments to the display device display during playback. Having the optimized display settings in advance allows adjustments to be made in advance of playback.

17 Claims, 13 Drawing Sheets

| Class | Content Classifier | Sound Mode | Picture Mode |
| --- | --- | --- | --- |
| Genre | Action | Movie | Movie |
| Genre | Sports | Standard | Sports |
| Genre | Comedy | Movie | Movie |
| Genre | Drama | Movie | Movie |
| Genre | Music | Music | Low Power |
| Genre | News | Dialogue | Vivid |
| Genre | Podcast | Dialogue | Low Power |
| Picture | Animated | Movie | Normal |
| Picture | Black+White | Movie | Normal |

FIG. 6

| Mode | Explanation | Backlight | Brightness | Color temp | Contrast | Color | Sharpness | Panel Chromaticity | Advanced PQ |
|---|---|---|---|---|---|---|---|---|---|
| Low Power | Optimized to save energy. This is the default "out of box" setting | Low | Moderate | Normal | Moderate | Moderate | Moderate | Native | Low |
| Normal | Good for everyday viewing in moderate to bright rooms | High | Moderate | Normal | Moderate | Moderate | Moderate | Native | Moderate |
| Vivid | Intense and brilliant picture for use in rooms with a lot of light | Full | Low | Cool | High | High | High | Native | High |
| Sports | Optimized for sports viewing where camera panning, and action shots are common | Full | Moderate | Cool | Moderate | High | High | Native | Moderate |
| Movie | Ideal for darker rooms to view the movie as the director intended | Lowest | Moderate | Warm D65 | Moderate | Moderate | Low | Rec709 | Disable |
| HDR dark | HDR movie mode | Full | Moderate | Warm D65 | Moderate | Moderate | Low | Rec2020 | Low |
| HDR normal | Best balance HDR PQ | Full | Moderate | Normal | Moderate | Moderate | Moderate | Rec2020 | Moderate |
| HDR bright | Aggressive HDR | Full | Moderate | Cool | Moderate | High | High | Rec2020 | High |

FIG. 7

|  | Standard | Dialogue | Movie | Music | Night |
|---|---|---|---|---|---|
| Bass | 0 | 0 | 0 | 0 | -10 (bass / sub off) |
| Treble | 0 | 0 | 0 | 0 | -2 |
| Surround Level | 0 | 0 | 0 | 0 | 0 |
| Speech Clarity | Auto | High | Off | Off | Low |
| Volume Mode | Leveling | Leveling | Off | Off | Night |
| Expanded Stereo | Movies & TV | Off | Movies & TV | Music | Off |
| Virtual Surround | Off | Off | On | Off | Off |

FIG. 8

```
┌─────────────────────────────────────────────────────────────────────┐
│  TRAIN ML MODELS WITH MEDIA CONTENT, MEDIA CONTENT CLASSIFIER,      │
│         MEDIA CONTENT DISPLAY/AUDIO SETTINGS                        │
│                                                              1002   │
└─────────────────────────────────────────────────────────────────────┘
                                  │
                                  ▼
┌─────────────────────────────────────────────────────────────────────┐
│                    RECEIVE NEW MEDIA CONTENT                        │
│                                                              1004   │
└─────────────────────────────────────────────────────────────────────┘
                                  │
                                  ▼
┌─────────────────────────────────────────────────────────────────────┐
│              DETERMINE PICTURE MODE OF MEDIA CONTENT                │
│                                                              1006   │
└─────────────────────────────────────────────────────────────────────┘
                                  │
                                  ▼
┌─────────────────────────────────────────────────────────────────────┐
│               DETERMINE SOUND MODE OF MEDIA CONTENT                 │
│                                                              1008   │
└─────────────────────────────────────────────────────────────────────┘
                                  │
                                  ▼
┌─────────────────────────────────────────────────────────────────────┐
│   MODIFY METADATA OF MEDIA CONTENT TO REFLECT PICTURE AND           │
│                       SOUND MODES                                   │
│                                                              1010   │
└─────────────────────────────────────────────────────────────────────┘
                                  │
                                  ▼
┌─────────────────────────────────────────────────────────────────────┐
│  STREAM MEDIA CONTENT WITH MODIFIED METADATA TO MEDIA SYSTEM        │
│                                                              1012   │
└─────────────────────────────────────────────────────────────────────┘
```

FIG. 10

```
┌─────────────────────────────────────────────────────────────────┐
│ TRAIN ML MODELS WITH MEDIA CONTENT, MEDIA CONTENT CLASSIFIER,   │
│    CROWDSOURCED MEDIA CONTENT DISPLAY/AUDIO SETTINGS            │
│                                                           1102  │
└─────────────────────────────────────────────────────────────────┘
                                  │
                                  ▼
┌─────────────────────────────────────────────────────────────────┐
│                   RECEIVE NEW MEDIA CONTENT                     │
│                                                           1104  │
└─────────────────────────────────────────────────────────────────┘
                                  │
                                  ▼
┌─────────────────────────────────────────────────────────────────┐
│              DETERMINE PICTURE MODE OF MEDIA CONTENT            │
│                                                           1106  │
└─────────────────────────────────────────────────────────────────┘
                                  │
                                  ▼
┌─────────────────────────────────────────────────────────────────┐
│               DETERMINE SOUND MODE OF MEDIA CONTENT             │
│                                                           1108  │
└─────────────────────────────────────────────────────────────────┘
                                  │
                                  ▼
┌─────────────────────────────────────────────────────────────────┐
│   MODIFY METADATA OF MEDIA CONTENT TO REFLECT PICTURE AND       │
│                         SOUND MODES                             │
│                                                           1111  │
└─────────────────────────────────────────────────────────────────┘
                                  │
                                  ▼
┌─────────────────────────────────────────────────────────────────┐
│  STREAM MEDIA CONTENT WITH MODIFIED METADATA TO MEDIA SYSTEM    │
│                                                           1112  │
└─────────────────────────────────────────────────────────────────┘
```

FIG. 11

CONTENT CLASSIFIERS FOR AUTOMATIC PICTURE AND SOUND MODES

BACKGROUND

Field

This disclosure is generally directed to display screen technology, and more particularly to automatic picture and sound selection for data streaming.

Background

Television (TV) picture and audio settings can have a dramatic impact on the quality of the TV viewing experience. For example, sports content and movie content may benefit from optimized picture and sound settings. Modern smart TVs attempt to adjust picture and audio settings automatically using Automatic content recognition (ACR), AI-based scene detection, and other tools, however today's methods require sampling playback in order to determine the corrections which should be applied. This limits how invasive the corrections can be without creating a jarring experience for the viewer. It can therefore be very complicated to create a single solution to handle a plurality of parameters and find an optimum set of combinations to select picture and sound parameters.

SUMMARY

Provided herein are system, apparatus, article of manufacture, method and/or computer program product embodiments, and/or combinations and sub-combinations thereof, for modifying one or more parameters of streamed data. An optimal picture and sound selection may be driven by many streaming parameters, such as, television parameters, media constructs, available bitrates, encoding techniques, network connection type (wired, WiFi, mobile), WiFi performance, processor performance, etc. The technology as described herein, in some embodiments, may be configured to improve picture and audio settings before the streamed data is played back on a display device, such as a television (TV). In some embodiments, the technology may be applied broadly to any configurable aspect of streaming video and/or audio.

BRIEF DESCRIPTION OF THE FIGURES

The accompanying drawings are incorporated herein and form a part of the specification.

FIG. 6 illustrates a table diagram of media content sound and picture modes, according to some embodiments.

FIG. 7 illustrates a table diagram of display device picture modes and display settings, according to some embodiments.

FIG. 8 illustrates a table diagram of display device sound modes and audio settings, according to some embodiments.

FIG. 10 illustrates a machine learning process diagram of audio/display settings selection, according to some embodiments.

FIG. 11 illustrates a crowdsource machine learning process diagram of an audio/display settings selection, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for providing audio/display parameters in conjunction with data streaming in advance of playback.

In some embodiments, the technology described herein may implement modified content streams to include genre information or optimized audio/display settings in metadata that allow TV platforms to apply Picture Quality/Audio Quality (PQ/AQ) adjustments automatically before content playback starts. Optimized infers making the best or most effective use of viewing/sound conditions for a selected media content. As will be described, these optimizations may be pre-selected by media content providers or distributers, automatically by a crowdsourced data analysis, by machine learning models or by a hybrid approach of machine learning models trained by crowdsourced data. Throughout the descriptions the term "display setting" refers to any display parameter for a display device to include any displayable attributes of media content, to include, but not be limited to, brightness, contrast, backlight, color temp, sharpness, chromaticity, resolution, or any other known or future display parameter.

In some embodiments, the technology described herein may implement the audio/display settings selection with a machine learning model. For example, the machine learning model, based on supervised training, may determine a future audio/display settings based on a forest decision tree based classifier that predicts a selected sound or picture mode (and associated display and audio settings) will occur given the selected media type for streaming.

Figure 1:
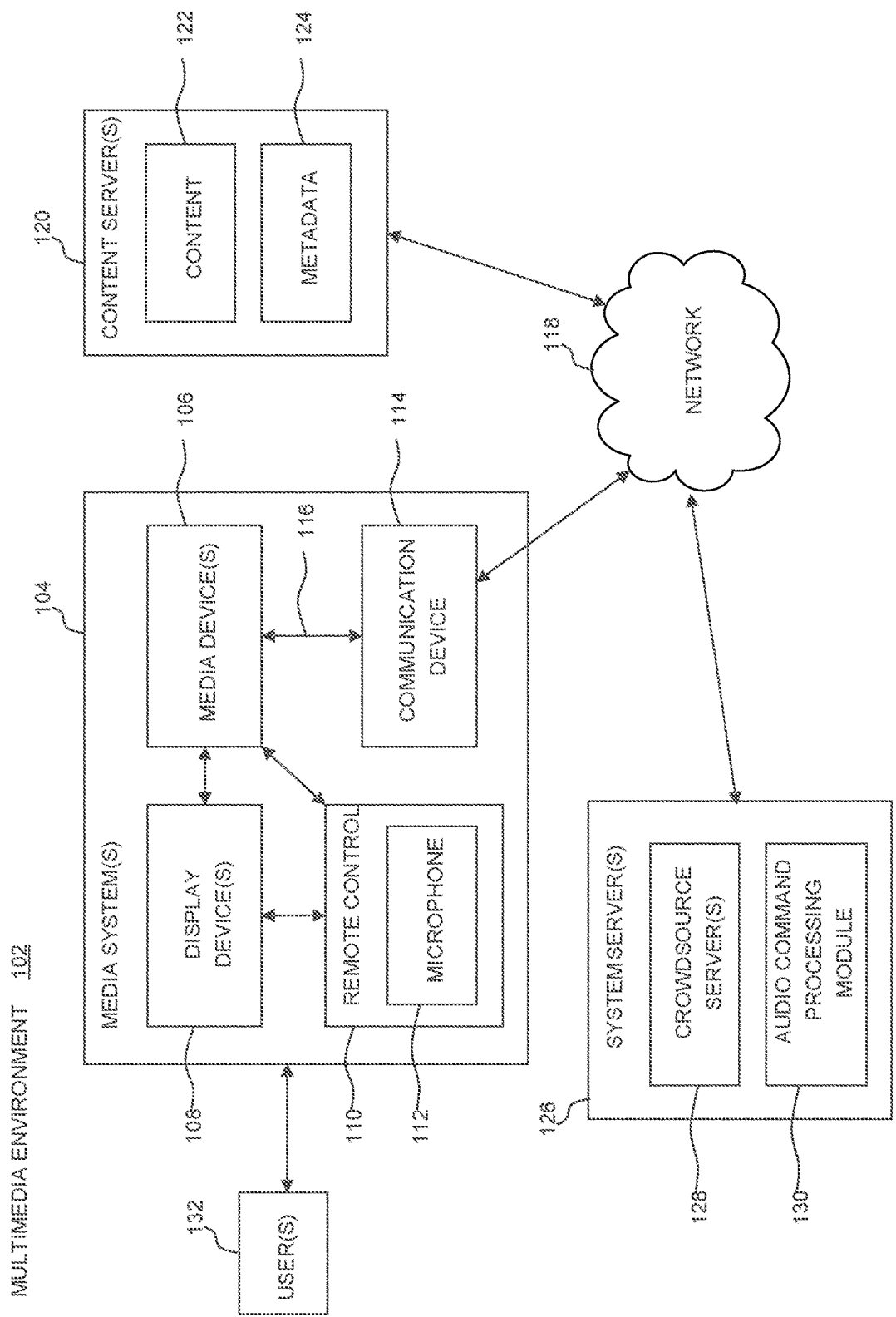
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), smart TV, computer, touch screen, smart phone, tablet, wearable (such as a watch or glasses), virtual reality (VR) headset, appliance, internet of things (IoT) device, automotive display, gaming display, heads-up display (HUD), and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as, but not limited to a trick mode index. Metadata 124 may also or alternatively include one or more of production information (audio formats, video formats, quality of content stream (e.g., low/high bitrate connection), resolution, etc.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming's of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
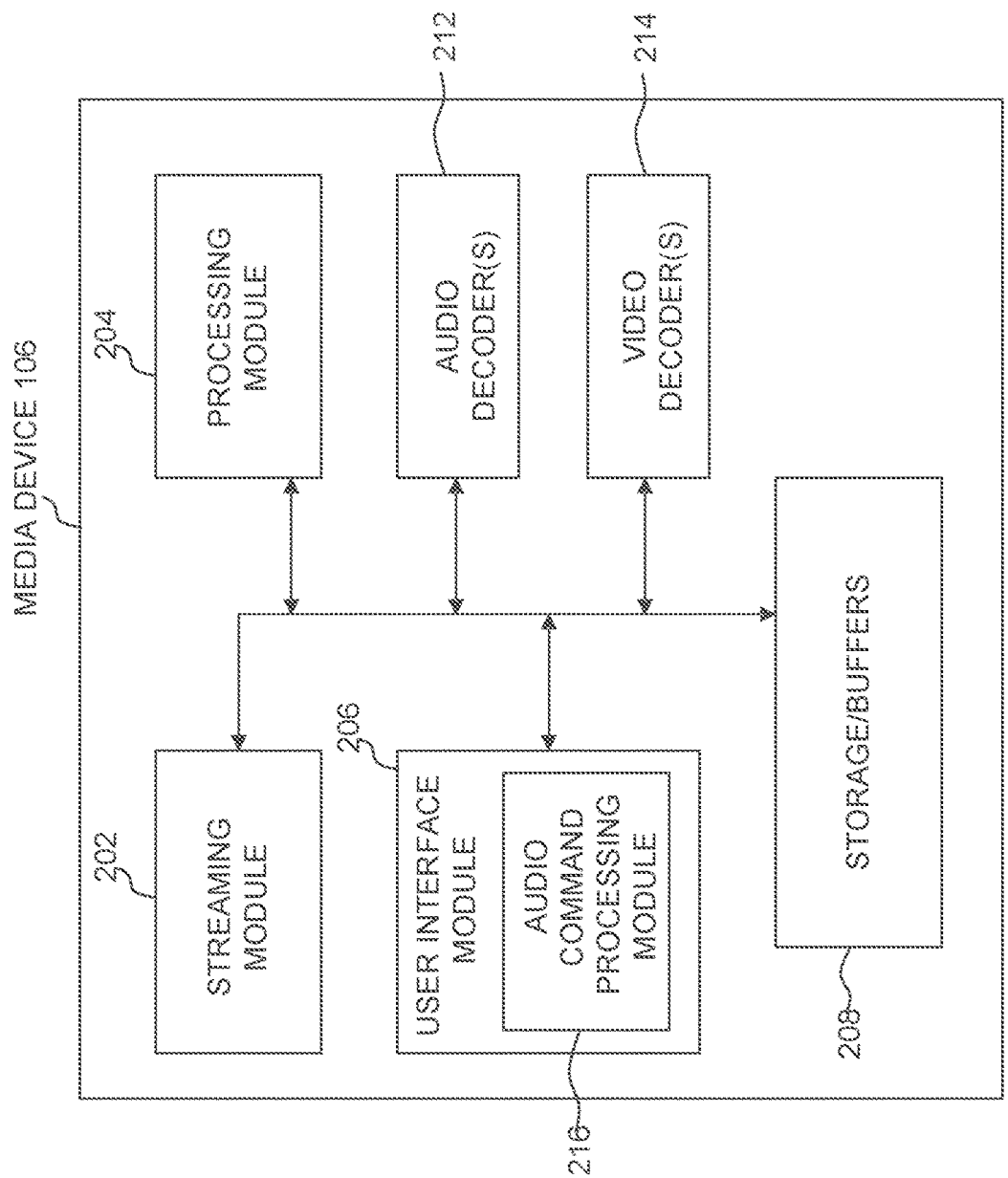
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, H.266, AV1, VP9, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Streaming Metadata Modification

The technology as described herein, in some embodiments, may be configured to improve picture and audio settings for streaming video and/or audio. In these embodiments, the technology may be applied broadly to any configurable aspect of an adaptive display or audio settings selection process.

Audio and display settings, such as bass and brightness modifications, may be controlled in most media devices while playing back streaming audio/video content. For example, a smart television may use a home network to provide streaming content 122 and services to an on-premises smart TV (e.g., display device 108). The smart TV typically buffers the streamed content and plays the buffered stream back on a display screen and speakers of the smart TV. While described for a standalone smart TV, the playback system may include ancillary video and audio components, such as handheld displays, sound bars, external speakers, external displays, etc.

Figure 3:
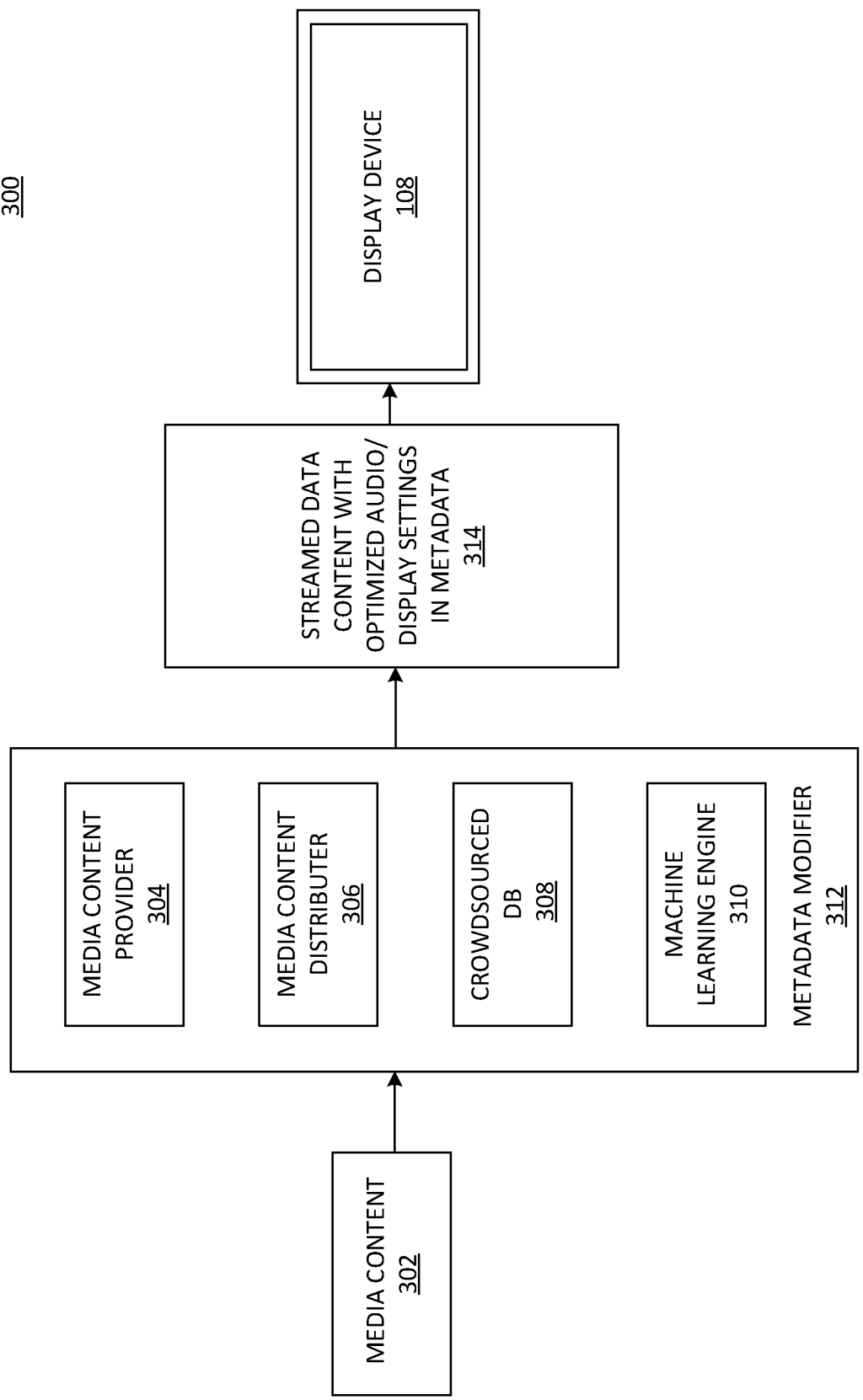
FIG. 3 illustrates a block diagram of audio/display settings selection, according to some embodiments.

FIG. 3 illustrates a block diagram of a media content metadata modifier system 300, according to some embodiments. Metadata modifier system 300 may be implemented by processing logic that can comprise hardware (e.g., circuitry, dedicated logic, programmable logic, microcode, etc.), software (e.g., instructions executing on a processing device), or a combination thereof. It is to be appreciated that not all components or steps described may be needed to perform the disclosure provided herein. Further, some of the components or steps described may be performed simultaneously, or in a different order than described for FIG. 3, as will be understood by a person of ordinary skill in the art. Metadata modifier system 300 may be part of system server(s) 126, be part of a media system, be part of a client streaming device, be a standalone system or be distributed on one or across or more systems (e.g., cloud system(s)).

In some embodiments, streamed media content may be downloaded and stored on the media device 106 or display device 108. As the media system 104 plays back the stored media content, changes to the audio or display setting may be changed manually by the user or automatically by an internal smart TV Automatic Content Recognition (ACR) system, AI-based scene detection, and other internal tools. In the first instance, manual adjustments require the user to test various settings during playback until they find a combination that they prefer. In the second instance, automatic adjustments require the smart TV to sample the playback and make adjustments. These choices are less than optimum as they require an interruption in the playback experience while adjustments are being made. The technology described herein will provide optimized sound and picture settings in advance of the playback process.

In an exemplary embodiment, metadata 124 associated with a media content 122 is modified to include the optimized sound and picture settings that are applied before playback, thus improving the user experience. This technical improvement to a display device's operation or a data streaming and playback operation, improves the quality of the playback on the display device not provided by previous methods.

As shown in FIG. 3, in various embodiments, the sound and picture adjustments provided in the metadata 124 may be generated by the metadata modifier 312 in a variety of ways. In some embodiments, the optimized sound and picture settings, in metadata 124, may be provided by the media content provider 304 or media content distributer 306. For example, for a sports data stream, the media content provider would modify the metadata to include specific audio and display settings optimized for sporting events. In a non-limiting example, the metadata 124 is modified to include a sound mode of standard and a picture mode of sports. As will be described in greater detail hereafter, these specific modes may be further mapped to device specific settings, such as brightness, contrast, color, bass, treble, speech, to name a few. While shown for a media content provider or distributor, the metadata may, in some embodiments, be modified to include optimized audio/display settings by the content originator.

Media Content Provider Requirements

As a participating media content source provider, one of multiple approaches may be implemented: Option 1: Add a content ID to the content manifest. Option 2: Tag all content with a system supplied content classifier and pass the content classifier with the content manifest. In some embodiments, the participating media content provider may provide a method to question miss-classified content and a further process to update or re-classify the media content.

In some embodiments, the display device makes a network call to lookup table for the content ID, retrieves a content classifier (e.g., may run in parallel to other network requests). As an alternate approach, a valid list of content classifiers will be provided to the media content provider. Alternatively, or in addition to, the content classifier may include sub-classifications, multiple classifications or have one or more different classifications distributed within the media content. For example, a movie may simultaneously have different classifications. In one non-limiting example, the movie may include any number of classifications, such as night scenes, scary scenes, and quiet scenes all in the same movie and therefore may adjust the television audio or display settings to match or optimize the different scenes. In this example embodiment, individual ones of multiple metadata may refer to different corresponding segments of the streamed media content.

In some embodiments, metadata modification is not enabled for previews. For example, someone watching a preview may not benefit from changing their television audio/display setting for such a short time period. Therefore, a participating media content provider, may identify content as playback or a preview.

In some embodiments, the media content source provider passes content classifier information included as part of the content manifest. Regardless of how the content classifier is obtained, it is passed with the media content metadata. The display device 108 subsequently applies PQ/AQ changes based on the metadata content classifier received. In some embodiments, an adaptive picture/audio model in a client device (e.g., media device 106) may, in some embodiments, perform the function of deciding which PQ/AQ changes will be made to the audio/display settings.

In one non-limiting example, the metadata modification processing may be performed by television circuitry, a media device 106, a content server 120, a system server 126, a video card, a gaming processor card, ancillary computing devices of user 132 or a combination of any of these processing elements.

In an exemplary embodiment, the media content is modified by an automated system that automatically adds the relevant audio and display settings metadata to the data content and either passes it back to the media content provider/distributer for storage or processes it in real-time and delivers it over network 118 to the media system 104 for storage (e.g., buffering) and playback on display device 108. The automated system will be described in greater detail hereafter.

In some embodiments, a crowdsourced database 308 includes the optimized audio and display settings and modifies the metadata to reflect these optimized audio and display settings for selected media content. In this embodiment, manual changes made by a user during playback are recorded, aggregated for multiple users and stored in a crowdsourced database (DB) 308. The crowdsource servers 128 analyze the aggregated audio/display setting changes to statistically determine what users determine to be the optimal settings for various types of programming (e.g., most frequent combination of setting changes). While described herein as using the crowdsourced data in a machine learning environment (FIG. 11), the crowdsource data may be analyzed by a standalone analysis system. For example, the system detects that many users increase the brightness, volume and bass while watching sports. These setting changes are recorded and aggregated in crowdsourced settings database (DB) 308 stored within crowdsource server(s) 128.

In some embodiments, a trained machine learning model 310 predicts the optimized picture and sound settings and modifies the metadata to reflect updated display and audio settings.

In some embodiments, the trained machine learning model 310 predicts the optimized picture and sound settings by ingesting, as training data, the crowdsourced audio and display settings data.

As the media content metadata is modified with optimized picture and sound settings, it may be stored locally in computer storage, distributed to media content storage nodes or streamed directly to the media device 106 or the display device 108.

Figure 4:
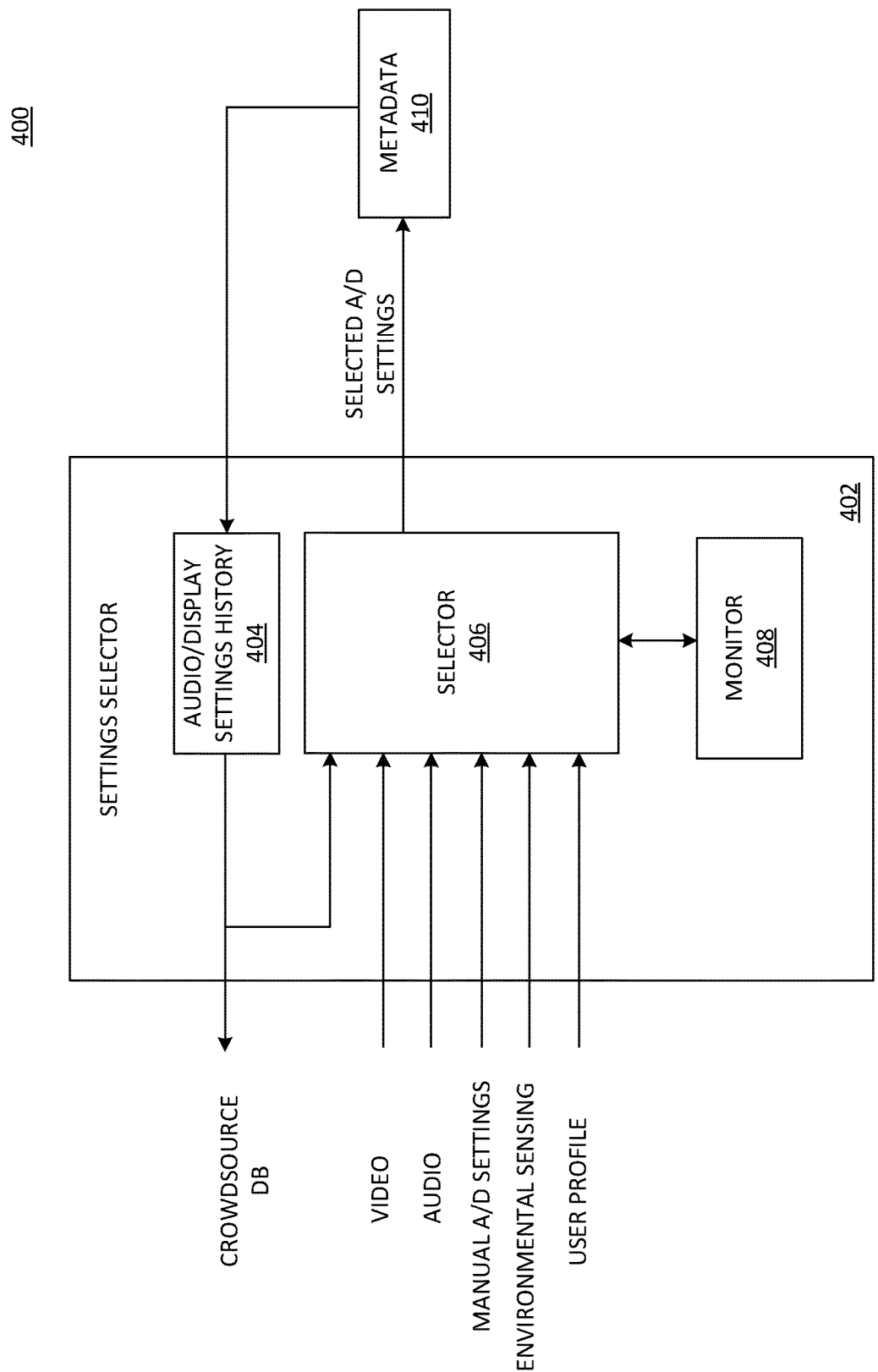
FIG. 4 illustrates a diagram of crowdsourcing audio/display settings, according to some embodiments.

FIG. 4 illustrates a block diagram of a crowdsourcing system 400, according to some embodiments. Crowdsourcing system 400 may be implemented by processing logic that can comprise hardware (e.g., circuitry, dedicated logic, programmable logic, microcode, etc.), software (e.g., instructions executing on a processing device), or a combination thereof. It is to be appreciated that not all components or steps may be needed to perform the disclosure provided herein. Further, some of the components or steps described may be performed simultaneously, or in a different order than described for FIG. 4, as will be understood by a person of ordinary skill in the art. The crowdsourcing system may be wholly contained within the display device 108 (e.g., smart TV), be part of an add-in system (e.g., as part of a plugin stick or card), be a hybrid system of internal and external components or be part of a cloud environment. The specific components may vary, but in any configuration, they collectively derive one or more user setting adjustments and forward these selections to crowdsource DB 308.

In various embodiments, the technology described in FIG. 4 may collect future audio/display settings with a crowdsourced model, one or more machine learning predictive models (FIG. 5), or a hybrid arrangement with a machine learning predictive models trained by crowdsourced data.

As shown, settings selector 402 may be configured with an audio/display (A/D) settings history component 404, selector component 406 and monitor component 408. Each of these components may be implemented by processing logic that can comprise hardware (e.g., circuitry, dedicated logic, programmable logic, microcode, etc.), software (e.g., instructions executing on a processing device), or a combination thereof.

The audio/display settings history component 404 retains a history of previous audio/display manual adjustment settings as metadata, an identification of the media content for which the selection was made, what was the timestamp in the content where the adjustment was made, who made the adjustment or what were the environmental conditions when the adjustment was made (was it loud, was is dark, etc.). For example, continuing with the earlier example, a user has selected a sporting event to stream. As the event plays back, the user may be dissatisfied with the current audio or display settings, or both. As they change the settings, a monitor 408 will record these changes as temporary changes. For example, a user may try many changes before they are happy with the settings. Once no additional changes are received for a given streamed media content selection, the selector 406 communicates the settings to metadata component 410. Alternatively, or in addition to, the system may, in some embodiments, communicate the selected A/D setting changes to the metadata component after a predetermined time passes after a last setting change (e.g., the monitor assumes that the user is satisfied if no additional changes have been made for X minutes). Alternatively, or in addition to, the system may, in some embodiments, communicate all selected A/D setting adjustments to the metadata component to identify preferences, trends or behavioral aspects of the user for training machine learning systems. For example, continuing from the earlier example, the system may note that the user immediately increases the volume for a sporting event, and then changes the bass and then changes the brightness. The ordering therefore may provide some intelligence to the machine learning system as to a prioritization of setting changes. Alternatively, or in addition to, the system may, in some embodiments, communicate the selected A/D setting adjustments to the metadata component when additional setting changes are made throughout the play back. The time placement of user setting adjustments may provide some intelligence to the machine learning system as to a pattern of setting changes. For example, as the user plays a music video on the television, they change the volume at particular points in the music. The system may therefore adapt multiple metadata modifications throughout a media content playback. Alternatively, or in addition to, the selector 406 may, in some embodiments, collect environmental inputs, such as, but not limited to ambient light. Alternatively, or in addition to, the selector 406 may, in some embodiments, consider user profile elements inputs, such as, but not limited to, prefers loud bass during sports, et al.

As will be described in greater detail, the history of display or audio setting adjustments may be an indicator for the machine learning models to predict the next display or audio settings for a same or similar streamed media content in the future. In a non-limiting embodiment, any number of past display or audio settings may be chosen.

Playback Firmware

In some embodiments, an 'auto' mode shall be added to the picture mode menu for supported platforms. In some embodiments, an 'auto' mode shall be added to the sound mode menu for any platform supporting Digital Signal Processing (DSP), for any TV with peripherals attached, Soundbars, or Streambars (e.g., Soundbar with built-in streaming). User facing 'Auto' settings for picture plus sound modes may be able to be independently enabled/disabled by configuration service flags, by platform, and may test functionality and disable the A/D setting changes for unforeseen impact results (e.g., blasting sound or dimly backlit scenes). If disabled, picture mode defaults to 'normal'; sound mode defaults to 'standard'. When 'auto mode' is enabled and user selects content to watch in a participating channel, prior to playback beginning one of the following paths is taken:

If the data stream includes content classifiers as part of the content manifest, the media system shall use the content classifier to trigger corresponding picture plus sound modes. If the data stream does not include content classifiers, the system node may, in some embodiments, makes a network call to request sound or picture mode information from node maps (e.g., genre information to content classifier). The node shall use the content classifier to trigger corresponding picture plus sound mode, when 'auto mode' is enabled. At conclusion of playback, picture mode reverts to 'normal'; sound mode reverts to 'standard'. In some embodiments, auto mode only applies to full-screen playback (not in-channel previews). When in auto mode, in some embodiments, the system may not alter picture quality/audio quality (PQ/AQ), for example, during livestreams or live content playback.

Figure 5:
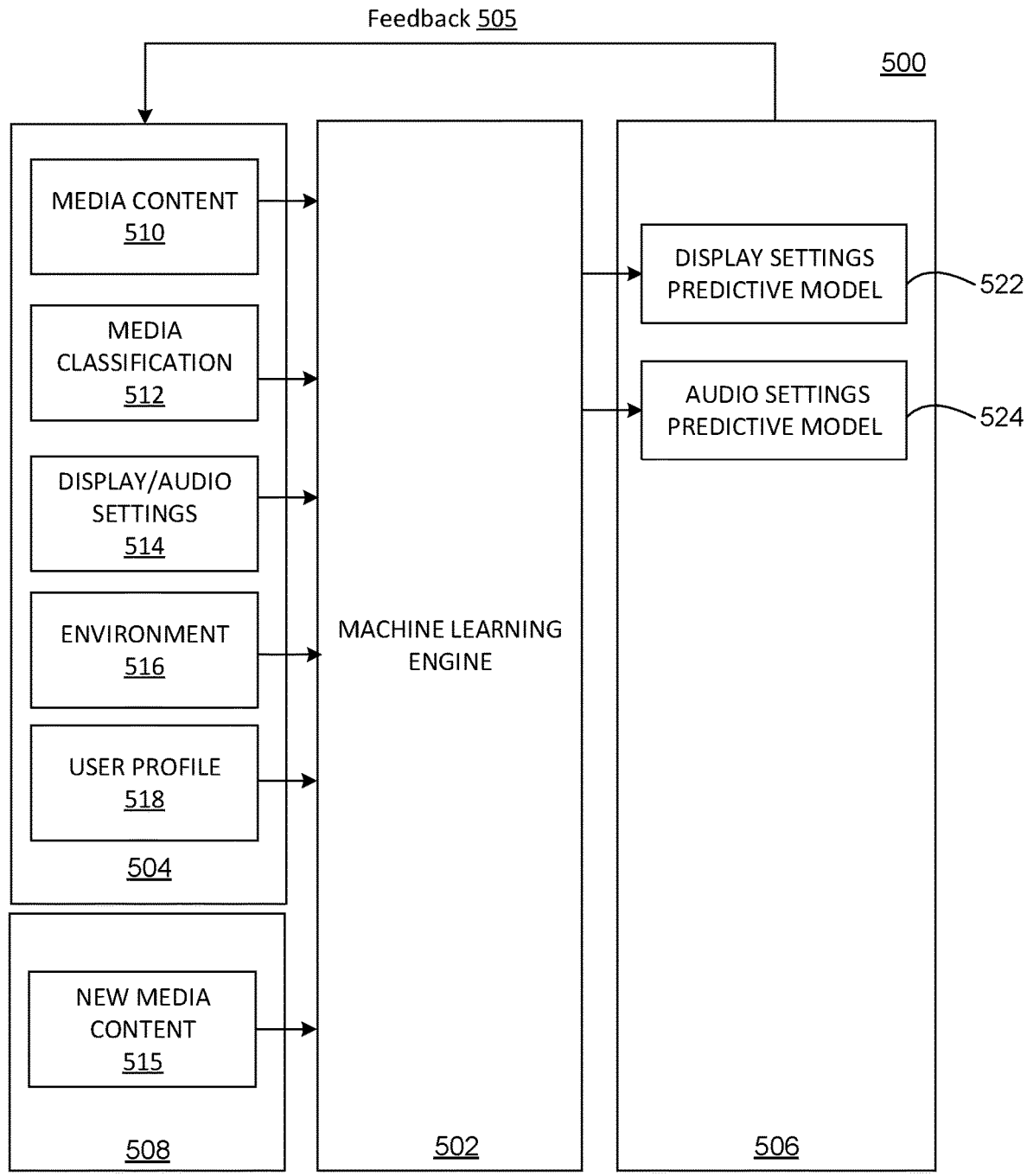
FIG. 5 illustrates a block diagram of a machine learning audio/display settings selection, according to some embodiments.

FIG. 5 is a block diagram of a machine learning system, according to some embodiments. A machine learning system 500 may include a machine learning engine 502 (e.g., one or more servers (cloud or local)) processing streaming parameters, such as, but not limited to, audio settings or display settings. The machine learning engine 502 processes the various streaming parameters to recognize relationships of these parameters as they relate to media content. As described in various embodiments, machine learning engine 502 may be used to predict audio/display settings. While described in stages, the sequence may include more or less stages or be performed in a different order.

Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning). Machine learning engine 502 may use various classifiers to map concepts associated with a specific streaming structure to capture relationships between streaming parameters and audio/display settings. The classifier (discriminator) is trained to distinguish (recognize) variations. Different variations may be classified to ensure no collapse of the classifier and so that variations may be distinguished.

In some embodiments, the predictive models 506 are implemented with a forest (random forest) decision tree based regressor. Random forests are an ensemble learning method for classification and regression that operate by constructing a multitude of decision trees at training time. For classification tasks, the output of the random forest is the class selected by most trees. For regression tasks, the mean or average prediction of the individual trees is returned. Regression analysis is a set of statistical processes for estimating the relationships between a dependent variable (often called the 'outcome' or 'response' variable) and one or more independent variables (often called 'predictors', 'covariates', 'explanatory variables' or 'features'). Regression analysis may be used for prediction or forecasting of the audio/display settings.

Machine learning may involve computers learning from data provided so that they carry out certain tasks. For more advanced tasks, it can be challenging for a human to manually create the needed algorithms. This may be especially true of teaching approaches to correctly identify optimized audio/display settings for streaming of video and/or audio. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers. For example, to train a system for the task of audio/display settings selection, a dataset of streaming parameters and corresponding known media classifications with associated audio and display settings may be used. In some embodiments, the data set may be include hundreds or thousands of media content selections and corresponding known media classifications with associated audio and display settings.

In an example embodiment, training data set 504 (e.g., media content 510, media classification 512, display/audio settings 514, environment 516, user profile 518, etc.) may be ingested to train various predictive models 506. Throughout the descriptions, "mode" is defined as a collection of specific settings. The machine learning engine may predict or infer specific display and audio settings separately or predict a specific set of settings or a subset of settings for a specific mode. In a first non-limiting example, a display settings predictive model 522 may be trained based on machine learning engine 502 processing training data set 504 to predict one or more next streaming display settings. Training a model means learning (determining) values for weights as well as inherent bias from any labeled examples. In supervised learning, a machine learning algorithm builds a model by examining many examples and attempting to find a model that minimizes loss; this process is called empirical risk minimization. A display settings predictive model 522, predicts (regresses) a next display setting for at least a part of a next media content. For example, after being trained on thousands of instances of media content 510, retaining media classifications 512 of action, comedy and drama for movies and their associated display/audio settings 514, the machine learning engine may predict the display settings for a new media content 515 and adjust the current display settings to the optimized settings. Alternatively, or in addition to, the training data may implement one or more of environmental 516 (e.g., ambient light) or user profile 518 data (who is watching, where are they watching, what are the conditions in the room when they are watching, what are they watching with (e.g., Audio/Video Receiver (AVR), connected speakers, etc.)

In another example embodiment, an audio settings predictive model 524 may be trained based on machine learning engine 502 processing training data set 504 to predict or infer a potential a next audio setting for at least a part of a new media content. Training a model means learning (determining) values for weights as well as inherent bias from any labeled examples. An audio settings predictive model 524 assigns a probability of an audio setting being selected for the media content.

The training data display/audio settings 514 may be derived from predetermined settings based on genre, media content type, time of day (e.g., day vs. night), power considerations, geography, to name a few. In addition, the display/audio settings are reflected by corresponding metadata associated with the media content stream. Alternatively, or in addition to, each media content may have one or more of a display setting, an audio setting, or both. For example, a media content may have a plurality of a display or audio settings distributed throughout a media content, changing the settings at one or more points in the streaming sequence during playback.

In some embodiments, each media content may have one or more of a display setting, an audio setting, or both, derived by crowdsourced data (FIG. 4). For example, the crowdsourced data may aggregate individual user setting changes made for a specific media content, for a specific segment of a specific media content, for a specific genre of media content, for a specific time or range of times of a day, etc. In this embodiment, the training data may source one or more of the media content, the media classification and the display/audio settings from the crowdsourced database. Alternatively, or in addition to, the training data may reflect a hybrid approach of predetermined data and crowdsourced data. For example, for a sporting event, the predetermined display/audio settings may be known. If, however, only a specific sound setting is changed, then only this data will need to be sourced from the crowdsourced database.

In some embodiments, the training cycle continuously looks at audio/display prediction results and provides a feedback loop 505 to improve capabilities of the various predictive models 506. Feedback refers to the process by which a machine model's predicted outputs are reused to train new versions of the model (522 or 524).

In addition, as various predictive models (algorithms) 506 are created, they are stored in a database (not shown). For example, as the training sets are processed through the machine learning engine 502, the models 522 and 524 may change (tuning/fine tuning) and therefore may be recorded in the database.

Future new data 508, for example, new media content 515, may be subsequently evaluated with the trained predictive models 506. While media content is included as a new input in one or more example embodiments, any known or future streaming parameter may be substituted without departing from the scope of the technology described herein.

Alternately, or in addition to, geo location of a streaming device may be used to train the machine learning models to learn characteristics of a device's location, such as a region. Alternately, the geo location may be implemented using clustering, based on geo locations, and then applying the machine learning models to each cluster. For example, the geolocation may be compared to a known "day vs. night" period and adjust the display device display/audio settings accordingly. For example, detecting an east coast location at 9:30 PM ET, may precipitate a change to a nighttime setting of a less bright display setting and lower volume. In some embodiments, the technology described herein may implement machine learning model training based on a local hour. For example, streaming data may vary during different hours of the day. In some embodiments, each local hour may be an input feature to the ML models or the system may cluster 24 hours into peak hours (e.g., 6 PM-9 PM), no peak hours, etc.

Alternately, or in addition to, a power selection of a streaming device may be used to train the machine learning models to learn characteristics of a device's power preferences. For example, display/audio settings may be modified for a device's settings of any of, but not limited to, low power, normal power, or high power (e.g., vivid settings). The training data may be adjusted to include one or more of the power settings as a streaming parameter of the media classification 512 and/or display/audio settings 514, or be a separate training data set.

Alternately, or in addition to, one or more of the training features or future features may be sampled at different frequencies to balance an outsized affect one feature data set may have on a machine learning model's output. In a non-limiting example, when implementing the audio settings predictive model 524, far more occurrences of a standard sound prediction would be expected than for an increase bass prediction. To reduce this high imbalance in predictions, a smaller sample size of previous standard sound predictions may be implemented for the training datasets to allow the audio settings predictive model 524 model to extract additional information and therefore balance the audio settings predictive model 524.

In some embodiments, the technology described herein may implement machine learning model training based on a specific streaming platform or streaming device. For example, different products may have different hardware capabilities such as Wi/Fi, chips, drives, CPU performance, etc. All of these factors may influence display/audio selections. Therefore, the platform and/or streaming device may train and deploy the machine learning models per platform or per device. The ML system may collect the specifics for each platform or device, or may cluster based on hardware capabilities, and then apply the machine learning models. For example, the system may be able to customize the display/audio settings for a specific television that may have surround sound capabilities vs. a tablet computer that may not have the same surround sound capabilities. In another example, each product generation from an Original Equipment Manufacturer (OEM) may retain new capabilities and features that may be accounted for in the machine learning training set.

The ML models may be trained offline in supervised fashion using data download logs. These models may be fed a number of input parameters. In some embodiments, the ML models may be deployed on a client device, such as media devices 106 or display devices 108 (e.g., televisions), or in the cloud.

FIG. 6 illustrates a chart of example audio/display settings, according to some embodiments. Audio/display selections may be indexed into predetermined media classifications such as genres, picture type, etc. As shown, for each class one or more content classifiers may be used. A shown, example content classifiers may be a genre, such as action, sports, comedy, drama, music, news podcasts, to name a few. For each genre, a predetermined display and audio setting is provided. For example, a predetermined setting may be derived by a content provider or a content distributed, et al. Another classifier may be "picture" or snapshot, with a content classifier of animated, black and white, color (not shown), etc.

In some embodiments, the modes correspond to a series of specific display/audio settings as shown in greater detail in FIGS. 7 and 8. Sound modes may include, but are not limited to, movie, standard, music and dialog, to name a few. Picture modes may include, but are not limited to, movie, sports, low power, vivid, normal, to name a few. Each of the modes may be further mapped to a series of specific display device settings. It is understood that each display device may have all, more, or less of the specific settings that make up a specific mode.

Alternatively, the display and audio settings may be optimized by a machine learning system based on a collection of different content provider's designations. For example, the training data may include the same media content from different media content providers that have varying predetermined settings for a specific genre or media content type.

FIG. 7 illustrates a chart of example picture modes as previously described in FIG. 6, according to some embodiments. As shown, the picture modes correspond to a series of specific display settings shown in an indexed LookUp Table (LUT). The table reflects various setting capabilities of a display device such as, but not limited to, backlight, brightness, color temperature, contrast, color, sharpness, panel chromaticity and advanced PQ (picture quality). While the indexed table reflects specific combinations of display device display settings for a specific mode, the specific combinations of settings, per mode, may be modified without changing the scope of the technology described herein. Also, as previously mentioned, a display device's capabilities may include or exclude one or more of these settings or add new settings as they become commercially available.

FIG. 8 illustrates a chart of example sound modes as previously described in FIG. 6, according to some embodiments. As shown, the sound modes correspond to a series of specific audio settings shown in an indexed LookUp Table (LUT). The table reflects various audio setting capabilities of a display device or ancillary sound device (e.g., Soundbar, Streambar or separate speakers, etc.) such as, but not limited to, bass, treble, surround level, speech clarity, volume mode, expanded stereo, virtual surround sound, etc. While the indexed table reflects specific combinations of display device/ancillary device audio settings for a specific mode, the specific combinations of settings per mode may be modified without changing the scope of the technology described herein. Also, a display or ancillary device's sound capabilities may include or exclude one or more of these settings or add new settings as they become commercially available (e.g., a new sound standard).

Figure 9:
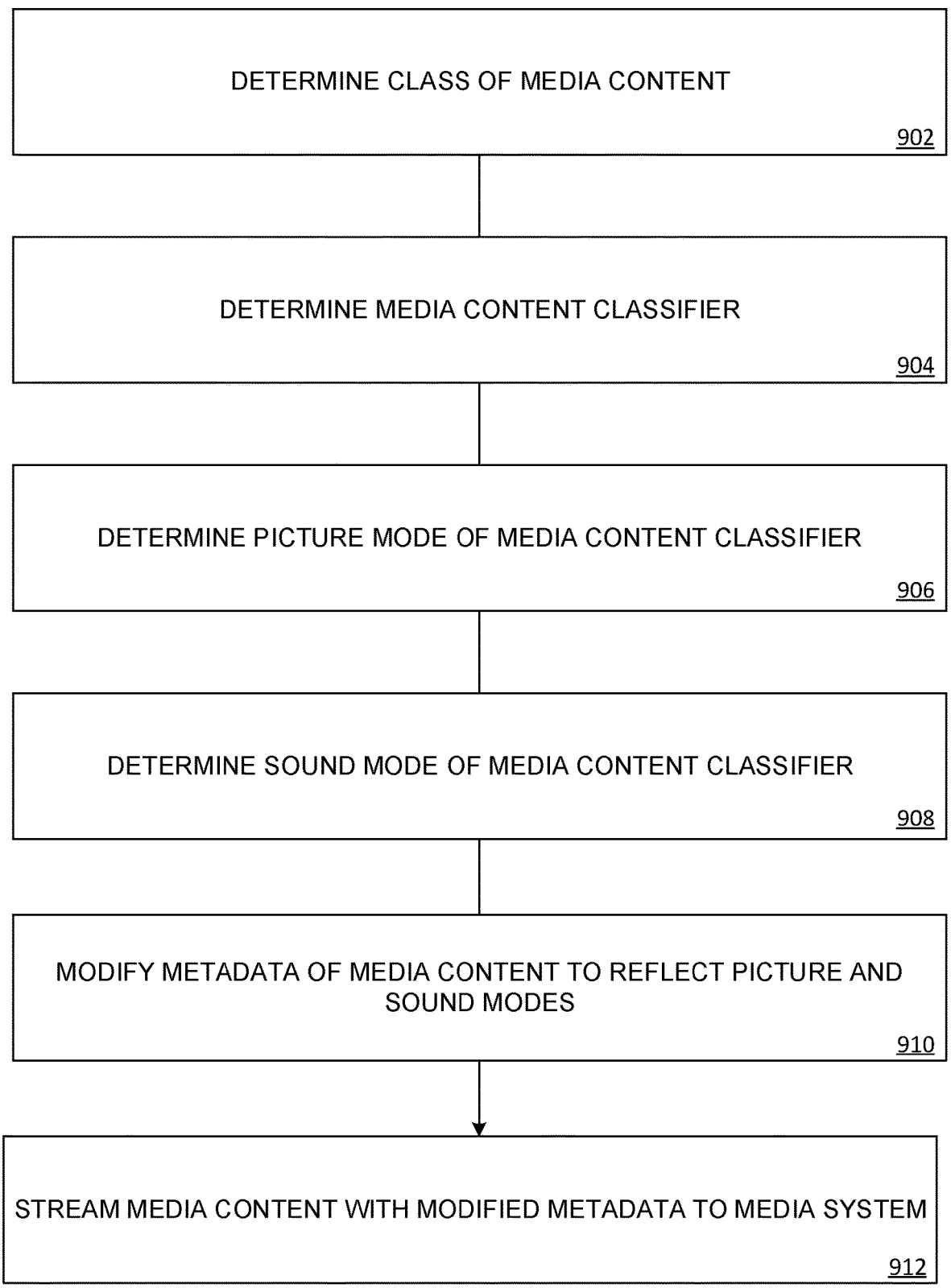
FIG. 9 illustrates a process diagram of audio/display settings selection, according to some embodiments.

FIG. 9 illustrates a flow diagram of an audio/display settings selection, according to some embodiments. Audio/display settings selection may be implemented by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than described for FIG. 9, as will be understood by a person of ordinary skill in the art.

In 902, a class of a specific media content is determined. For example, class may include genre, picture, or other media content types that collimate specific display/audio settings for that content type.

In 904, a media content classifier is determined. For example, media content classifier's may include action, sports, comedy, drama, music, news, podcast, animation, or pictures (color or B/W), or any other classifier that collimates specific display/audio settings for a specific class.

In 906, a picture mode of a media content classifier is determined. For example, a picture mode may be a movie, sports, low power, normal or vivid mode or any other picture mode that collimates specific display settings for a specific media content classifier.

In 908, a sound mode of a media content classifier is determined. For example, a sound mode may be a movie, standard, music, dialog or any other sound mode that collimates specific audio settings for a specific media content classifier.

In 910, metadata for a specific media content is updated to reflect picture and sound settings for subsequently streamed media content.

In 912, media content is streamed to a media device with the updated picture and sound settings. For example, the media device is a television that receives the streamed content and adjusts one or more of the television's individual picture and sound settings to match the settings identified in the updated metadata.

Any known or future streaming parameter may be substituted without departing from the scope of the technology described herein. In some embodiments, the technology described herein may implement one or both of the predictive models as part of firmware loaded onto a streaming device. Alternately, or in addition to, the models may be located remotely (e.g., in the cloud) and configured to connect to streaming devices.

FIG. 10 illustrates a flow diagram of an audio/display settings selection, according to some embodiments. Audio/display settings selection may be implemented by processing logic that can comprise hardware (e.g., circuitry, dedicated logic, programmable logic, microcode, etc.), software (e.g., instructions executing on a processing device), or a combination thereof. For example, the flow diagram can be implemented using the ML, system 500 as shown and described in FIG. 5. It is to be appreciated that not all steps may be needed to perform the disclosure provided herein. Further, some of the steps may be performed simultaneously, or in a different order than described for FIG. 10, as will be understood by a person of ordinary skill in the art.

In 1002, a machine learning system is configured to train display settings and audio settings predictive models. The training data may include the media content and its associated media classification and display/audio settings, such as shown in FIGS. 6-8.

In 1004, new media content is received by the ML system. In some embodiments, the new media content is ingested and processed by classifiers of the trained display and audio predictive models (e.g., algorithms) to predict optimized display and audio settings for the new media content. Optimal display and audio settings may be determined based on machine learning over hundreds or thousands of previously classified media content. In addition, in some embodiments, as new media content is classified, these data results will be fed back into the training set.

In 1006, the sound mode of the media content is determined. The sound mode may be a single audio setting for a playback device or include a plurality of audio settings.

In 1008, the picture mode of the media content is determined. The picture mode may be a single display setting for a playback device or include a plurality of display settings.

In 1010, based on the predicted optimal display and audio settings, metadata that accompanies the media content during streaming with be modified or updated to reflect these display and audio settings. Predictions may be selected to be a classification above any threshold to improve or relax the process of selecting an audio/display setting. For example, a probability of over 90% may be selected to predict an optimal selection when the classifier is 90% sure of the selection.

In 1012, the selected media content and updated or modified metadata is streamed (download data) to a client device, such as media devices 106. For example, for sports program is streamed with sports associated or optimized display and audio settings.

Any known or future streaming parameter may be substituted without departing from the scope of the technology described herein. In some embodiments, the technology described herein may implement one or both of the predictive models as part of firmware loaded onto a streaming device. Alternately, or in addition to, the models may be located remotely (e.g., in the cloud) and configured to connect to streaming devices.

FIG. 11 illustrates a flow diagram of an audio/display settings selection, according to some embodiments. Audio/display settings selection may be implemented by processing logic that can comprise hardware (e.g., circuitry, dedicated logic, programmable logic, microcode, etc.), software (e.g., instructions executing on a processing device), or a combination thereof. For example, the flow diagram can be implemented using the crowdsource server 128 in FIG. 1, the ML system 500 of FIG. 5 and the crowdsource collection system of FIG. 4, et al. It is to be appreciated that not all steps may be needed to perform the disclosure provided herein. Further, some of the steps may be performed simultaneously, or in a different order than described for FIG. 11, as will be understood by a person of ordinary skill in the art.

In 1102, a machine learning system is configured to train display and audio settings predictive models. The training data may include the media content and its associated media classification and crowdsourced display/audio settings, such as shown in FIG. 4. For example, specific picture and sound modes and one or more of their specific display and audio settings are sourced from crowdsource database 308 (FIG. 3). For example, a user modifies sound settings for a specific movie (i.e., media content) or genre of movie (e.g., action). This setting change and the specific setting, such as increased bass 10 dB to 80 dB, may be collected and aggregated into the crowdsource database 308. This data may then be associated with the specific movie for future training of the audio and display settings predictive models. While described for a specific sound setting that a user adjusted, the training data may include all other settings that were not changed and that collectively may represent a new or customized sound mode for a class or classification. In some embodiments, predefined picture and sound mode data (e.g., display and audio settings) may be mixed with customer crowdsourced data to train the models, in a hybrid approach.

In 1104, new media content is received by the ML system. In some embodiments, the new media content is ingested and processed by classifiers of the trained display and audio predictive models (e.g., algorithms) to predict optimized display and audio settings for the new media content. Optimal display and audio settings may be determined based on analytical learning over hundreds or thousands of previously classified media content. In addition, in some embodiments, as new media content is classified, these data results will be fed back into the training set.

In 1106, the sound mode of the media content is determined. The sound mode may be a single audio setting for a playback device or include a plurality of audio settings.

In 1108, the picture mode of the media content is determined. The picture mode may be a single display setting for a playback device or include a plurality of display settings.

In 1110, based on the predicted optimal display and audio settings, metadata that accompanies the media content during streaming with be modified or updated to reflect these display and audio settings. Predictions may be selected to be a classification above any threshold to improve or relax the process of selecting an audio/display setting. For example, a probability of over 90% may be selected to predict an optimal selection when the classifier is 90% sure of the selection.

In 1112, the selected media content and updated or modified metadata is streamed (download data) to a client device, such as media devices 106. For example, for sports program is streamed with sports associated or optimized display and audio settings.

Any known or future streaming parameter may be substituted without departing from the scope of the technology described herein. In some embodiments, the technology described herein may implement one or both of the predictive models as part of firmware loaded onto a streaming device. Alternately, or in addition to, the models may be located remotely (e.g., in the cloud) and configured to connect to streaming devices.

Figure 12:
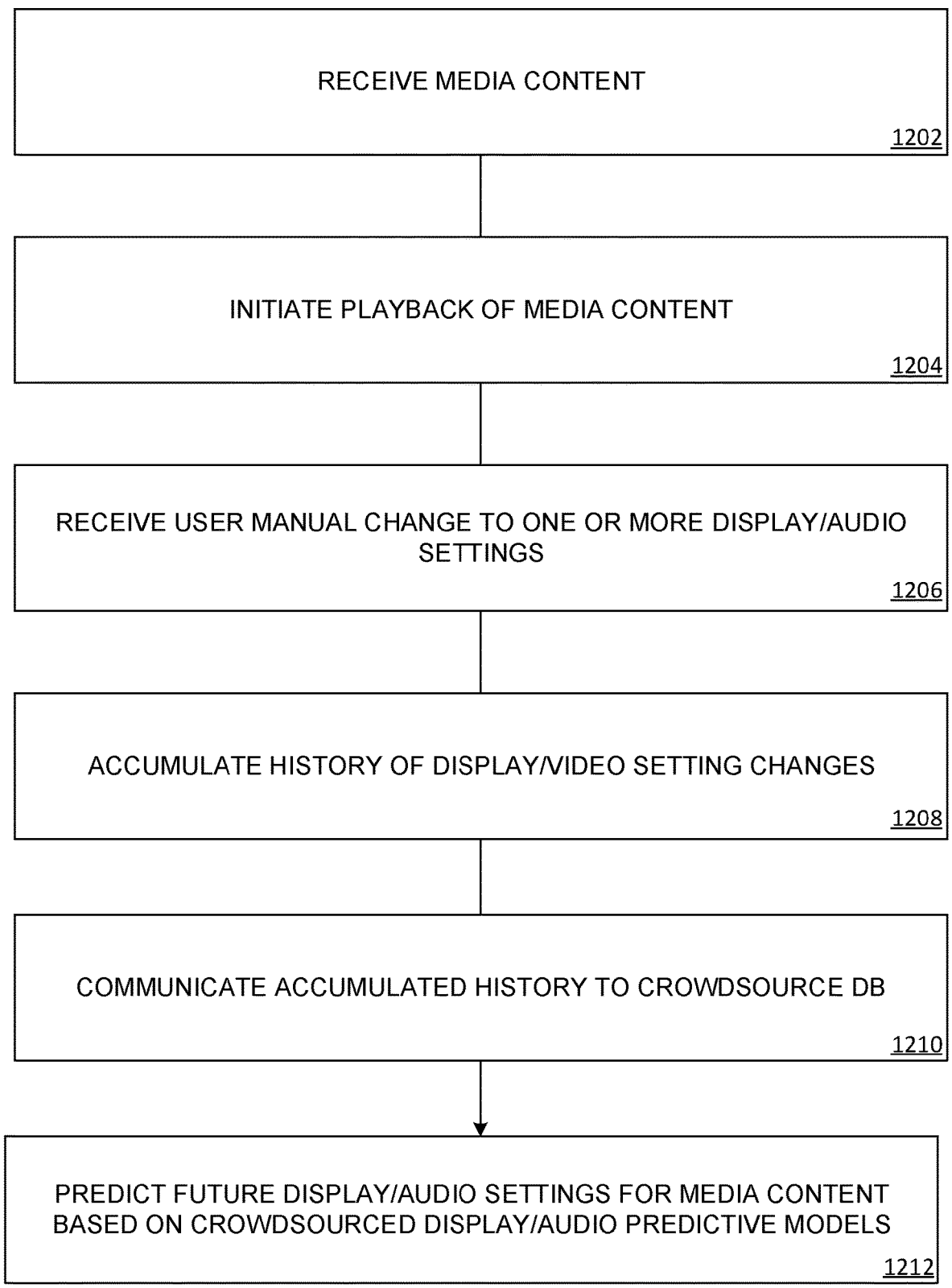
FIG. 12 illustrates a process diagram of crowdsourcing audio/display settings, according to some embodiments.

FIG. 12 illustrates a flow diagram of crowdsourcing audio/display settings selection, according to some embodiments. Audio/display settings selection may be implemented by processing logic that can comprise hardware (e.g., circuitry, dedicated logic, programmable logic, microcode, etc.), software (e.g., instructions executing on a processing device), or a combination thereof. For example, the flow diagram can be implemented in conjunction with the crowdsource server 128 in FIG. 1, the ML system 500 of FIG. 5 and the crowdsource collection system of FIG. 4, et al. It is to be appreciated that not all steps may be needed to perform the disclosure provided herein. Further, some of the steps may be performed simultaneously, or in a different order than described for FIG. 12, as will be understood by a person of ordinary skill in the art.

In 1202, media system (e.g., media device 106 or display device 108 (e.g., smart TV) receives media content 122 from media content provider 120. For example, a user requests a specific movie and the media system initiates a download from content server 120, where it is buffered locally for playback on a display screen and/or sound system.

In 1204, the media system initiates playback of the streamed media content. For example, the media device communicates one or more portions from the buffer at a playback rate, based at least in part on the quality of the presentation desired by the user (e.g., HD format).

In 1206, the media system detects a user's manual adjustment of one or more picture or sound settings and records these as shown in FIG. 4, element 408.

In 1208, when the adjustments are final (e.g., after a set time with no additional adjustments), the media system accumulates the history of adjustments, recognizing the final adjustments or recognizing a plurality of adjustments made throughout the playback of the streamed media content.

In 1210, the media system communicates the picture/sound adjustments to the crowdsource server 128, where they are stored and aggregated in crowdsource database 308. In a non-limiting example, the aggregation may be by media content title or ID, or by class, classifier, mode, geography, time of day, display device capabilities, or any other parameter associated with the playback device or media content.

Any known or future streaming parameter may be substituted without departing from the scope of the technology described herein. In some embodiments, the technology described herein may implement one or both of the predictive models as part of firmware loaded onto a streaming device. Alternately, or in addition to, the models may be located remotely (e.g., in the cloud) and configured to connect to streaming devices.

Example Computer System

Figure 13:
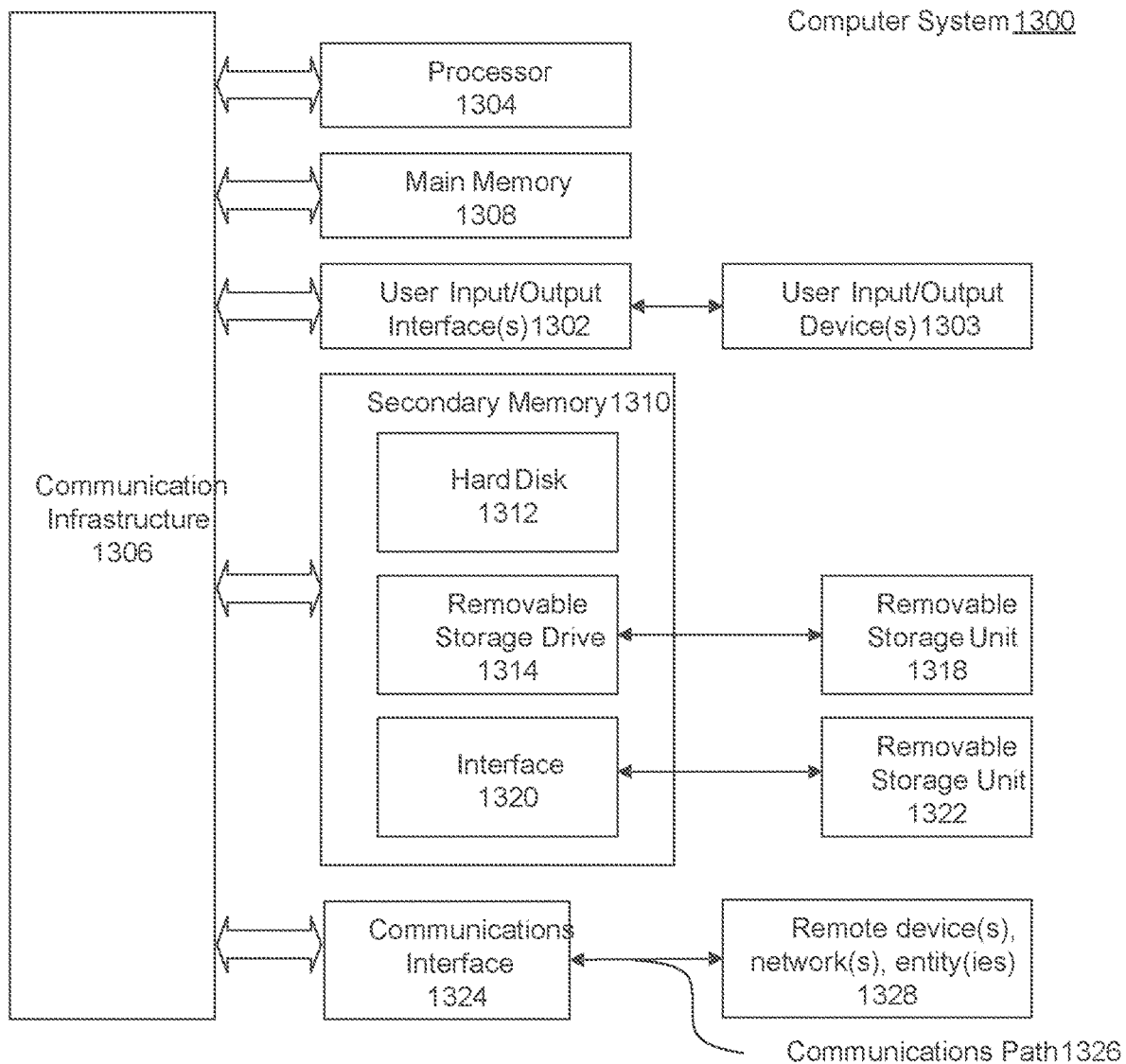
FIG. 13 illustrates an example computer system useful for implementing various embodiments.

Various embodiments may be implemented, for example, using one or more well-known computer systems, such as computer system 1300 shown in FIG. 13. For example, the media device 136 may be implemented using combinations or sub-combinations of computer system 1300. Also or alternatively, one or more computer systems 1300 may be used, for example, to implement any of the embodiments discussed herein, as well as combinations and sub-combinations thereof.

Computer system 1300 may include one or more processors (also called central processing units, or CPUs), such as a processor 1304. Processor 1304 may be connected to a communication infrastructure or bus 1306.

Computer system 1300 may also include user input/output device(s) 1302, such as monitors, keyboards, pointing devices, etc., which may communicate with communication infrastructure 1306 through user input/output interface(s) 1302.

One or more of processors 1304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, etc.

Computer system 1300 may also include a main or primary memory 1308, such as random access memory (RAM). Main memory 1308 may include one or more levels of cache. Main memory 1308 may have stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 may include a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 may read from and/or write to removable storage unit 1318.

Secondary memory 1310 may include other means, devices, components, instrumentalities or other approaches for allowing computer programs and/or other instructions and/or data to be accessed by computer system 1300. Such means, devices, components, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1300 may further include a communication or network interface 1324. Communication interface 1324 may enable computer system 1300 to communicate and interact with any combination of external devices, external networks, external entities, etc. (individually and collectively referenced by reference number 1328). For example, communication interface 1324 may allow computer system 1300 to communicate with external or remote devices 1328 over communications path 1326, which may be wired and/or wireless (or a combination thereof), and which may include any combination of LANs, WANs, the Internet, etc. Control logic and/or data may be transmitted to and from computer system 1300 via communication path 1326.

Computer system 1300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300 or processor(s) 1304), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 13. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method performed by a system having at least a processor and a memory therein, wherein the method comprises:
   receiving, from a client device, a data streaming request for media content;
   determining a class of the media content;
   determining a plurality of content classifiers associated with the class of the media content;
   determining, by a machine learning engine and a display settings predictive model, a picture mode for each of the plurality of content classifiers, wherein the picture mode includes one or more playback device display settings, and wherein the display settings predictive model comprises a forest decision tree based classifier to predict the one or more playback device display settings;
   determining, by the machine learning engine and an audio settings predictive model, a sound mode for each of the plurality of content classifiers, wherein the sound mode includes one or more playback device audio settings, and wherein the audio settings predictive model comprises the forest decision tree based classifier to predict the one or more playback device audio settings;
   generating metadata associated with corresponding segments of the media content to include one or more of the picture mode or the sound mode; and
   streaming the media content, with the generated metadata, to a media system for playback using any of the one or more playback device display settings or the one or more playback device audio settings.

2. The method of claim 1, wherein the display settings predictive model is trained by predetermined picture settings.

3. The method of claim 1, wherein the display settings predictive model is trained by crowdsourced picture settings.

4. The method of claim 1, wherein the audio settings predictive model is trained by predetermined audio settings.

5. The method of claim 1, wherein the audio settings predictive model is trained by crowdsourced audio settings.

6. The method of claim 1, wherein the metadata includes any number of: the class, the plurality of content classifiers, the one or more playback device display settings, or the one or more playback device audio settings for the media content associated with the corresponding segments in the streamed media content.

7. A system comprising:
a memory; and
at least one processor coupled to the memory and configured to perform operations comprising:
receiving, from a client device, a data streaming request for media content;
determining a class of the media content;
determining a plurality of content classifiers associated with the class of the media content;
determining, by a machine learning engine and a display settings predictive model, a picture mode for each of the plurality of content classifiers, wherein the picture mode includes one or more playback device display settings, and wherein the display settings predictive model comprises a forest decision tree based classifier to predict the one or more playback device display settings;
determining, by the machine learning engine and an audio settings predictive model, a sound mode for each of the plurality of content classifiers, wherein the sound mode includes one or more playback device audio settings, and wherein the audio settings predictive model comprises the forest decision tree based classifier to predict the one or more playback device audio settings;
generating metadata associated with corresponding segments of the media content to include one or more of the picture mode or the sound mode; and
streaming the media content, with the generated metadata, to a media system for playback using any of the one or more playback device display settings or the one or more playback device audio settings.

8. The system of claim 7, wherein the display settings predictive model is trained by predetermined picture settings.

9. The system of claim 7, wherein the display settings predictive model is trained by crowdsourced picture settings.

10. The system of claim 7, wherein the audio settings predictive model is trained by predetermined audio settings.

11. The system of claim 7, wherein the audio settings predictive model is trained by crowdsourced audio settings.

12. The system of claim 7, the operations further comprising:
inferring the one or more playback device display settings or the one or more playback device audio settings based on one or more of: environmental inputs or a user profile.

13. A non-transitory computer-readable medium having instructions stored thereon that, when executed by at least one computing device, cause the at least one computing device to perform operations comprising:
receiving, from a client device, a data streaming request for media content;
determining a class of the media content;
determining a plurality of content classifiers associated with the class of the media content;
determining, by a machine learning engine and a display settings predictive model, a picture mode for each of the plurality of content classifiers, wherein the picture mode includes one or more playback device display settings, and wherein the display settings predictive model comprises a forest decision tree based classifier to predict the one or more playback device display settings;
determining, by the machine learning engine and an audio settings predictive model, a sound mode for each of the plurality of content classifiers, wherein the sound mode includes one or more playback device audio settings, and wherein the audio settings predictive model comprises the forest decision tree based classifier to predict the one or more playback device audio settings;
generating metadata associated with corresponding segments of the media content to include one or more of the picture mode or the sound mode; and
streaming the media content, with the generated metadata, to a media system for playback using any of the one or more playback device display settings or the one or more playback device audio settings.

14. The non-transitory computer-readable medium of claim 13, the operations further comprising:
training the audio settings predictive model by predetermined audio settings.

15. The non-transitory computer-readable medium of claim 13, the operations further comprising:
training the audio settings predictive model by crowdsourced audio settings.

16. A method performed by a media device having at least a processor and a memory therein, wherein the method comprises:
specifying a first machine learning model trained by a machine learning system using a first set of a plurality of streaming parameters, wherein the first machine learning model includes one or more display setting selection algorithms to select one or more display settings for a plurality of segments of media content, wherein the first machine learning model comprises a forest decision tree based classifier to predict the one or more display settings;
specifying a second machine learning model trained by the machine learning system using a second set of the plurality of streaming parameters, wherein the second machine learning model includes one or more sound selection algorithms to select one or more audio settings for the plurality of segments of the media content wherein the second machine learning model comprises a forest decision tree based classifier to predict the one or more audio settings;
receiving a streaming request for the media content;
predicting, using the first machine learning model, the one or more display settings for the media content;
predicting, using the second machine learning model, the one or more audio settings;
generating metadata for corresponding segments of the plurality of segments of the media content to include any of the one or more display settings or the one or more audio settings; and
streaming the media content, with the generated metadata, to a media system for playback using any of the one or more display settings and the one or more audio settings.

17. A method performed by a media device having at least a processor and
a memory therein, wherein the method comprises:
specifying a first machine learning model trained by a machine learning system using a first set of a plurality of crowdsourced streaming parameters, wherein the first machine learning model includes one or more display setting selection algorithms to select one or more display settings for a plurality of segments of media content, wherein the first machine learning model comprises a forest decision tree based classifier to predict the one or more display settings;

specifying a second machine learning model trained by the machine learning system using a second set of the plurality of crowdsourced streaming parameters, wherein the second machine learning model includes one or more sound selection algorithms to select one or more audio settings for the plurality of segments of the media content, wherein the second machine learning model comprises the forest decision tree based classifier to predict the one or more audio settings;

receiving a streaming request for the media content;

predicting, using the first machine learning model, the one or more display settings for the media content;

predicting, using the second machine learning model, the one or more audio settings;

generating metadata for corresponding segments of the plurality of segments of the media content to include any of the one or more display settings or the one or more audio settings; and streaming the media content, with the generated metadata, to a media system for playback using any of the one or more display and the one or more audio settings.

* * * * *

UNITED STATES PATENT AND TRADEMARK OFFICE
CERTIFICATE OF CORRECTION

| | |
|---|---|
| PATENT NO. | : 12,316,921 B2 |
| APPLICATION NO. | : 17/743898 |
| DATED | : May 27, 2025 |
| INVENTOR(S) | : Nangeroni et al. |

It is certified that error appears in the above-identified patent and that said Letters Patent is hereby corrected as shown below:

In the Drawings

On Sheet 11 of 13, FIG. 11, Tag "1111", delete "1111" and insert -- 1110 --, therefor.

In the Specification

In Column 5, Line 17, delete "OGG" and insert -- OGG, --, therefor.

In Column 5, Line 22, delete "(wmy," and insert -- (wmv, --, therefor.

In Column 5, Line 29, delete "DVCPRO, DVCPRO," and insert -- DVCPRO, --, therefor.

In Column 9, Line 17, delete "play back." and insert -- playback. --, therefor.

In Column 10, Line 67, delete "may be" and insert -- may --, therefor.

In Column 12, Line 58, delete "increase" and insert -- increased --, therefor.

In Column 13, Line 26, delete "A shown," and insert -- As shown, --, therefor.

In Column 15, Line 5, delete "ML," and insert -- ML --, therefor.

In Column 15, Line 34, delete "with be" and insert -- will be --, therefor.

In Column 16, Line 41, delete "with be" and insert -- will be --, therefor.

In Column 18, Line 23, delete "and/any" and insert -- and/or any --, therefor.

Signed and Sealed this
Thirtieth Day of December, 2025

John A. Squires
*Director of the United States Patent and Trademark Office*

CERTIFICATE OF CORRECTION (continued)
U.S. Pat. No. 12,316,921 B2

In the Claims

In Column 22, Claim 16, Line 45, delete "a forest" and insert -- the forest --, therefor.